June 9, 1964     I. W. NORTH     3,136,284
GEAR SHIFT CONTROL MEANS FOR OUTBOARD PROPULSION UNIT
Filed July 20, 1962     5 Sheets-Sheet 1
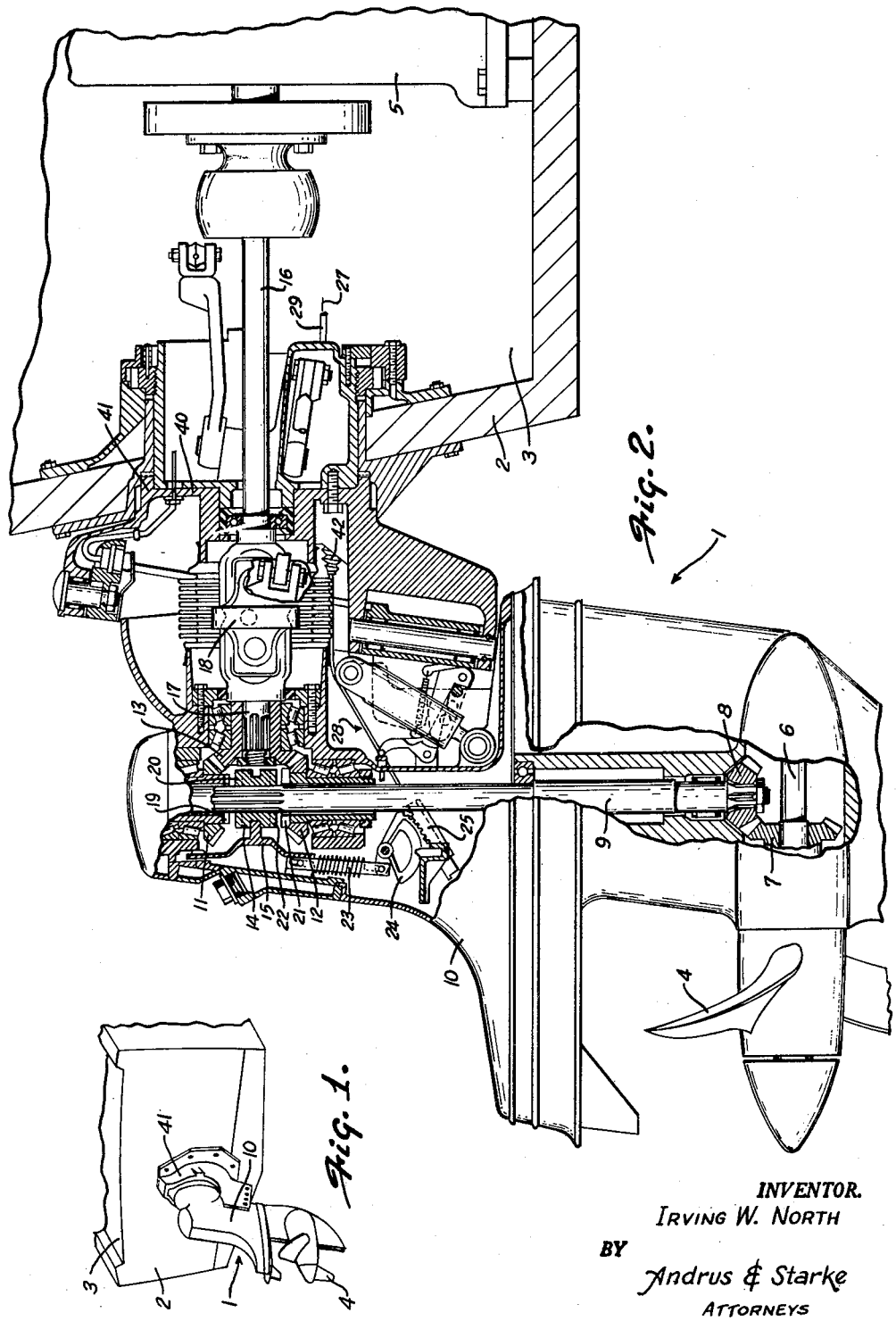
INVENTOR.
IRVING W. NORTH
BY
*Andrus & Starke*
ATTORNEYS

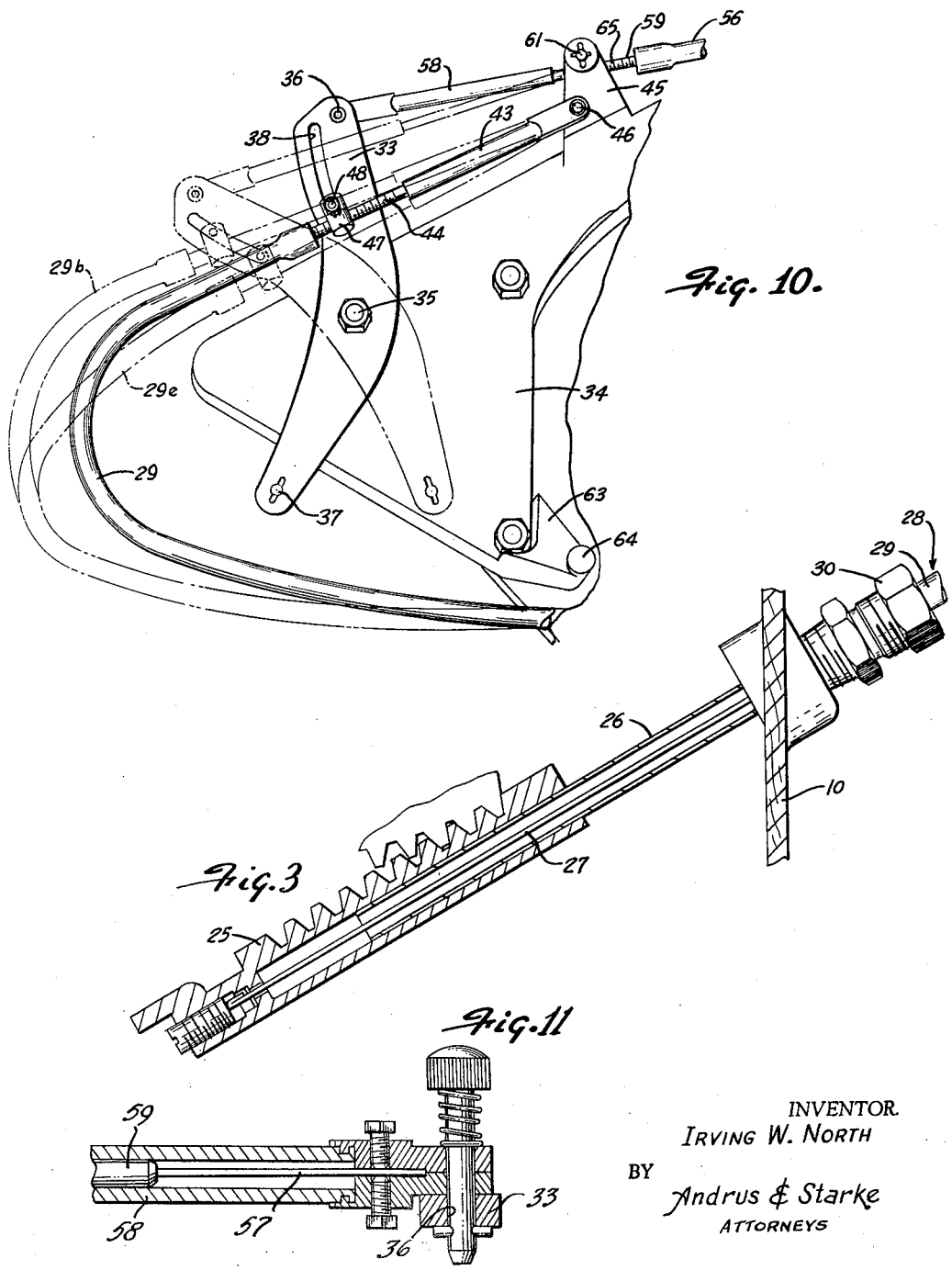

June 9, 1964     I. W. NORTH     3,136,284
GEAR SHIFT CONTROL MEANS FOR OUTBOARD PROPULSION UNIT
Filed July 20, 1962     5 Sheets-Sheet 3

INVENTOR.
IRVING W. NORTH
BY
Andrus & Starke
ATTORNEYS

June 9, 1964      I. W. NORTH      3,136,284
GEAR SHIFT CONTROL MEANS FOR OUTBOARD PROPULSION UNIT
Filed July 20, 1962      5 Sheets-Sheet 4
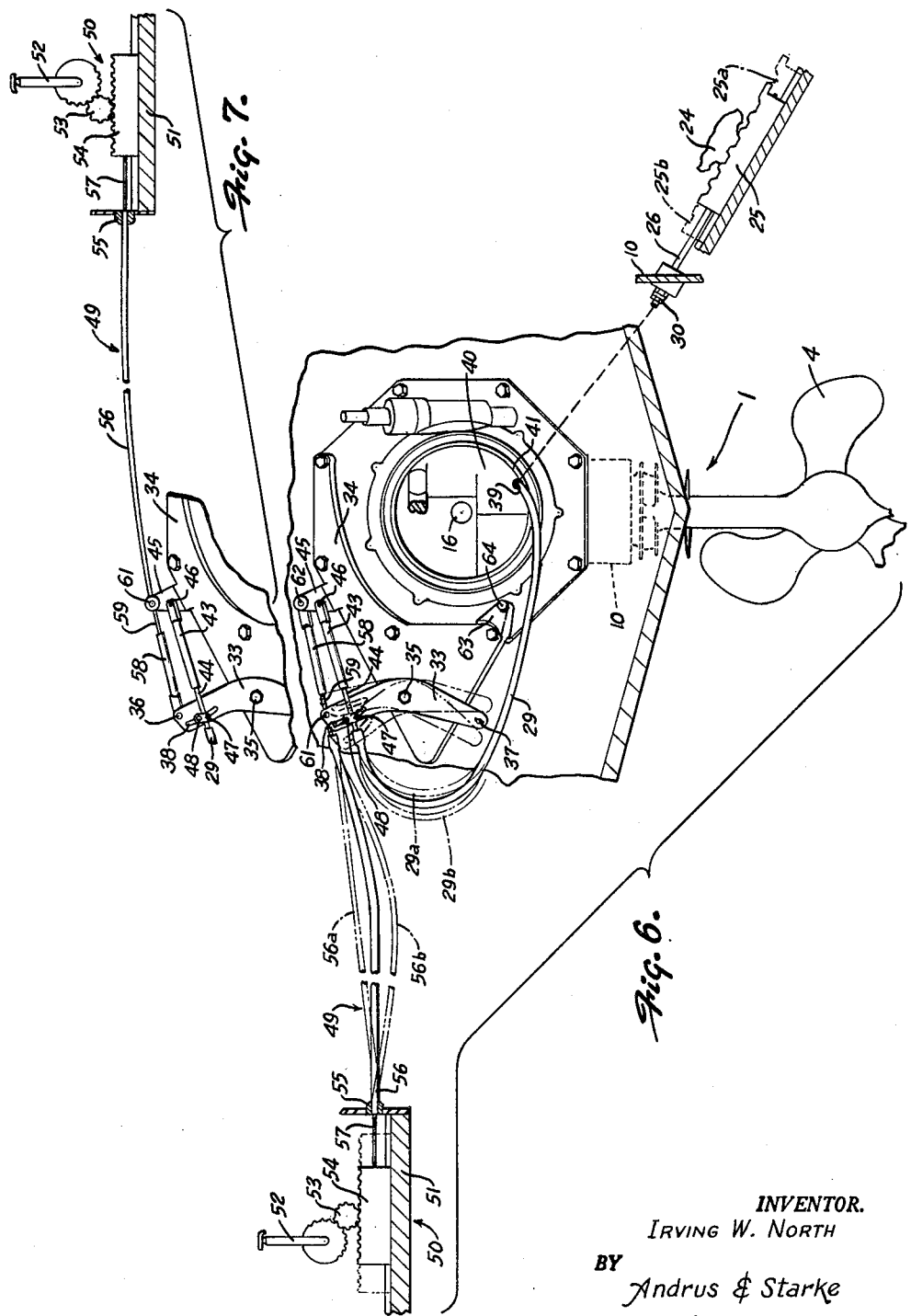
INVENTOR.
IRVING W. NORTH
BY
Andrus & Starke
ATTORNEYS

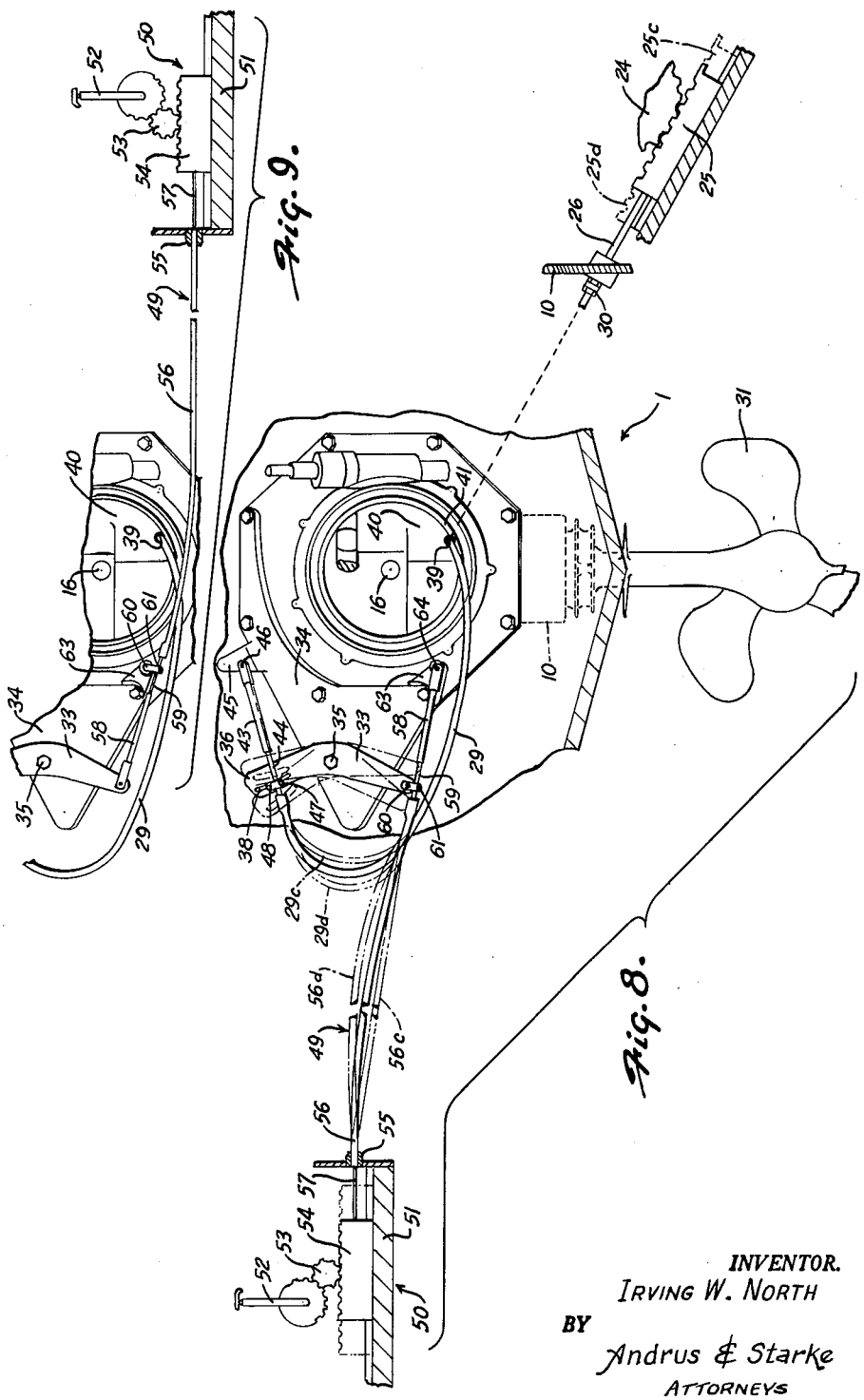

United States Patent Office 3,136,284
Patented June 9, 1964

3,136,284
GEAR SHIFT CONTROL MEANS FOR OUTBOARD PROPULSION UNIT
Irving W. North, Fond du Lac, Wis., assignor to Kiekhaefer Corporation, Cedarburg, Wis., a corporation of Delaware
Filed July 20, 1962, Ser. No. 211,313
13 Claims. (Cl. 115—35)

This invention relates to gear shift control means for outboard propulsion units for water-craft.

In outboard propulsion units driven by inboard engines it is desirable to have all controls pass through an opening in the transom that accommodates the drive shaft. Where the forward and reverse clutch is incorporated in the outboard propulsion unit it becomes desirable to provide some form of remote control for actuating the clutch from a position in the boat adjacent the driver.

Various problems arise from the use of propellers of opposite hand, and also from the desire of a boat owner to position the remote control unit on either side of the boat.

According to the present invention, lever means in the boat are employed to transmit the forces required to effect the shift, and a push-pull actuating means including a remote control unit is selectively connected to the lever means to actuate the same from either side and in either direction depending upon which side of the boat the remote control unit is mounted and whether a right or left hand propeller is employed. The invention further contemplates means for synchronizing the several push-pull means and thereby providing for timely and complete clutch engagement with the forward and reverse gears in accordance with operation of the remote shift control unit.

The drawings furnished herewith illustrate the best mode for carrying out the invention as presently contemplated and set forth hereinafter.

In the drawings:

FIGURE 1 is a perspective view of the outboard portion of an inboard-outboard drive shown mounted on the transom of a watercraft;

FIG. 2 is an enlarged partial side elevation of an inboard-outboard drive with parts broken away and sectioned and showing clutch actuating means as employed with right hand propeller rotation;

FIG. 3 is an enlarged fragmentary view of the rack means for actuating the clutch element;

FIG. 6 is an enlarged view taken generally on line 6—6 of FIG. 5 and schematically shows the remote shift control arrangement and its operation for use with a propeller of right hand rotation as controlled from the right side of the watercraft as one faces forwardly;

FIG. 7 is a fragmentary view showing a modification of FIG. 6 wherein the remote control unit is mounted on the left side of the water craft as one faces forwardly;

FIG. 8 is a view similar to that of FIG. 6 and shows schematically the remote shift control arrangement and its operation for use with a propeller of left hand rotation as controlled from the right side of the watercraft as one faces forwardly;

FIG. 9 is a fragmentary view showing a modification of FIG. 8 wherein the remote control unit is mounted on the left side of the watercraft as one faces forwardly;

FIG. 10 is an enlarged fragmentary view and shows the means for adjusting or synchronizing the remote control unit operation with operation of the control lever or walking beam; and FIG. 11 is a detail section showing how the core wire of a push-pull cable is secured to a telescoping element.

Figure 4:
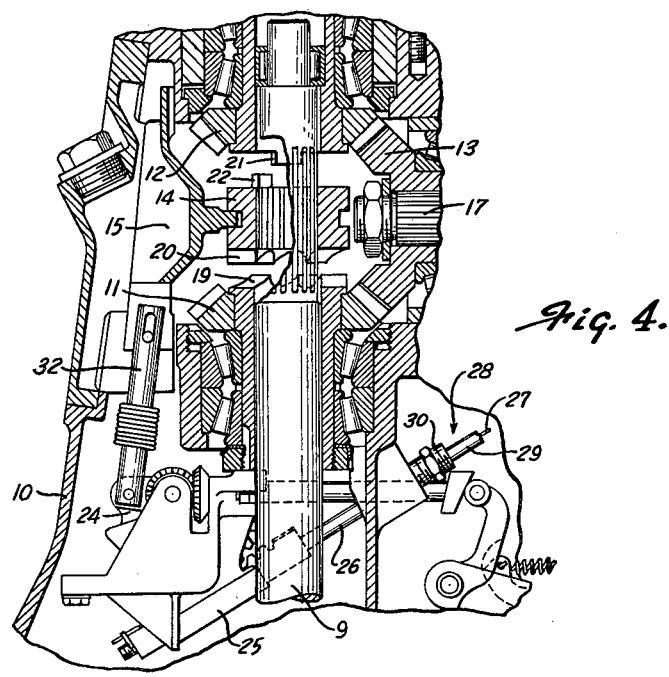
FIG. 4 is an enlarged partial side elevation of the outboard drive unit and shows the clutch actuating means, clutch and reverse gears as employed for left hand propeller rotation.
Figure 5:
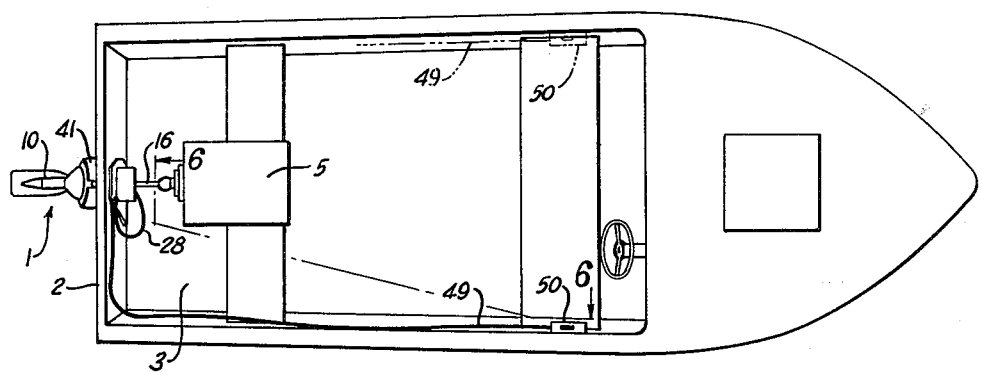
FIG. 5 is a plan view of a watercraft equipped with an outboard propulsion unit and showing remote shift control means mounted on one side of the watercraft and in phantom lines indicates an alternative mounting on the opposite side of the watercraft.

Referring to the drawings, the inboard-outboard drive includes a drive or propulsion unit 1 which is pendantly and dirigibly suspended outboard from the transom 2 of a watercraft 3. The propulsion unit 1 includes a propeller 4 which is driven by the engine 5 mounted inboard of the water-craft to be propelled.

The propeller 4 illustrated in FIG. 2, is adapted for right hand propeller rotation and is carried by the generally horizontal propeller shaft 6 which is driven through beveled gears 7 and 8 by the generally vertical shaft 9 rotatably supported within housing 10 of the propulsion unit 1. A pair of vertically spaced beveled gears 11 and 12, the upper one of which is a forward gear and the lower a reverse gear, are mounted in suitable bearings and are freely rotatable on the upper end of shaft 9. The drive gear 13, the axis of which is generally horizontally disposed, drivingly engages the beveled gears 11 and 12 and causes the latter to rotate in opposed directions. A clutch element 14 disposed between beveled gears 11 and 12 is splined upon shaft 9 and is slidable axially thereon by slide member 15 to selectively engage gears 11 and 12 to complete the drive connection between the drive gear 13 and vertical shaft 9. The clutch element 14 also has an intermediate neutral position between gears 11 and 12 in which case the propeller 4 is inoperative.

The drive gear 13 is driven by engine 5 through the generally horizontal drive connection including axially spaced and aligned shaft members 16 and 17 which are connected by the double universal joint 18. Universal joint 18 is disposed generally with the center thereof at the intersection of the generally transverse vertical and horizontal planes respectively containing the swivel and tilt axes of the propulsion unit 1 so that the drive connection from engine 5 is not disturbed during steering and tilt movements of the propulsion unit.

In the operation of the gear shift control means, the teeth 19 on the lower clutch engaging face of forward gear 11 are engaged by the complementary teeth 20 on the corresponding face of clutch element 14 to provide forward propulsion with a right hand propeller 4. Reverse operation of propulsion unit 1 with reverse operation of propeller 4 is obtained when clutch element 14 is moved axially downwardly to provide engagement between the clutch engaging teeth 21 on the reverse gear 12 and the teeth 22 on the corresponding face of the clutch element.

The clutch element 14 is actuated to selectively engage gears 11 and 12 to provide forward and reverse operation of the propulsion unit respectively, by the slide member 15 connected through linkage 23 to the rotatably supported sector gear 24. The sector gear 24 meshingly engages the rack 25 which is slideable on the tubular guide 26 supported from housing 10 of the propulsion unit. The rack 25 is selectively movable downwardly from a neutral position to rotate the sector gear 24 and thereby provide upward movement of the slide member 15 together with clutch element 14 to engage with forward gear 11. Upward movement of the rack 25 from its neutral position rotates sector gear 24 to move the slide member 15 and clutch element 14 downwardly into engagement with the reverse gear 12. As will be more fully described hereinafter, rack 25 is actuated by the core wire 27 of the push-pull cable 28 which has its casing 29 fixedly secured relative to housing 10 within the anchor element 30 in alignment with guide tube 26 for the rack.

Under certain circumstances it may be desired or necessary to employ a propeller 31 which is adapted for left hand propeller rotation. Such would be the case, for example, where two inboard-outboard drives with counter-rotating propellers 4 and 31 are jointly utilized to drive a watercraft so that the undesirable steering torques set up by the respective propellers are substantially offset or balanced. As shown in FIG. 4, the relative positions of the forward and reverse gears 11 and 12 are reversed for a left hand propeller 31 from their respective positions as described for right hand propeller 4 so that selective actuation of clutch element 14 for forward and reverse propulsion is also reversed. To attain reverse actuation of clutch element 14 for a left hand propeller 31, the slide member 15 as connected to the gear sector 24 through linkage 32 is also reversely actuated by the sector gear and rack 25 which are moved reversely from their movements as described for a right hand propeller 4 by the cable 28. Thus, for a left hand propeller 31, rack 25 is selectively movable upwardly from its neutral position to pull slide member 15 together wtih clutch element 14 downwardly into engagement with the forward gear 11 and thereby provide forward propulsion of the drive unit. Conversely the rack 25 is moved downwardly from its neutral position to push the slide member 15 and clutch element 14 upwardly into engagement with reverse gear 12 to provide rearward propulsion of the drive with a left hand propeller 31.

This reverse actuation of the clutch for left hand propellers is effected merely by the reverse actuation of push-pull cable 28.

For the purpose of actuating push-pull cable 28 by remote control from either side of the boat, an oscillating lever or walking beam 33 is pivotally mounted substantially at its center to the transom bracket 34 at 35. Adjacent to the extreme ends thereof and substantially equidistantly from its center, the beam 33 is provided with cable mounting holes 36 and 37. Intermediate its center and the upper mounting hole 36, beam 33 includes a generally radially extending arcuate adjustment slot 38 which will be more fully described hereinafter.

The push-pull cable 28, having one end of the core wire 27 thereof secured to rack 25 and the corresponding end of the casing 29 thereof fixed relative to the housing 10 of the propulsion unit as described hereinbefore, extends through an opening 39 in the partition wall 40 of support housing 41 for the propulsion unit and into the interior of the watercraft. To prevent ingress of water into the watercraft through opening 39 and permit relative movement between the cable 28 and the opening, an extendable bellows element 42 has one end thereof secured to the cable casing 29 and the other end thereof secured to the partition wall 40 around opening 39 on the outboard side of the partition wall.

The inboard end of cable 28 is provided with a telescoping mechanism including the tubular members 43 and 44. The tubular member 43 constitutes a rigid end portion of the core wire 27 of cable 28 and the free end thereof is pivotally secured to the projection 45 of the transom bracket 34 at anchor location 46. Tubular member 44 constitutes a rigid extension of the casing 29 of cable 28 and is slidable within tubular member 43. The tubular casing extension member 44 carries a barrel connection element 47 which is pivotally supported by the pin 48 adjustably secured in the slot 38 of the lever or walking beam 33.

As shown generally in FIG. 6, for a right hand propeller 4 the beam 33 has a neutral position in which cable 28 holds rack 25 in its neutral position. When the beam 33 is pivoted in a clockwise direction from its neutral position to decrease the effective length of the telescoping mechanism, the cable casing 29 is pulled into a smaller tighter loop 29a. With the inboard end of the core wire 27 fixed, clockwise rotation of beam 33 to decrease the casing loop causes the outboard end of core wire 27 to move to an extended position and thereby move rack 25 downwardly into its forward drive position 25a. Movement of beam 33 in a counterclockwise direction from neutral increases the effective length of the telescoping mechanism and forces cable casing 29 into the larger loop 29b causing the outboard end of core wire 27 to move to a contracted position pulling rack 25 upwardly into its reversed drive position 25b.

In the case of a left hand propeller 31, wherein the forward and reverse positions of rack 25 are reversed from the corresponding rack positions for a right hand propeller, the actuation of beam 33 is likewise reversed as generally shown in FIG. 8. Thus, clockwise movement of beam 33 from its neutral position decreases the effective length of the telescoping mechanism and pulls the cable casing 29 into the smaller loop 29c causing the outboard end of the core wire 27 to move to its extended position moving rack 25 into the reverse drive position 25c. And conversely counterclockwise rotation of beam 33 from neutral forces cable casing 29 into the enlarged loop 29d causing the outboard end of core wire 27 to move to a contracted position pulling rack 25 into the forward drive position 25d.

The walking beam 33 is pivoted in the required manner to selectively provide forward and reverse drive for the propulsion unit, and is actuated by push-pull cable 49 from the remote control unit 50 which can be mounted on either side of the watercraft. The control unit 50 generally includes a housing 51, shown only in part, which rotatably supports the control handle 52. The control handle 52 has a generally upright neutral position and is selectively rotatable in either direction from neutral to rotate the gear element 53 and thereby slidably move the rack 54 in a corresponding direction within housing 51. The push-pull cable 49 extends to housing 51 and a coupler element 55 fixedly secures the cable casing 56 to housing 51 generally in alignment with the direction of rack travel. The core wire 57 of cable 49 extends through the coupler element 55 and into the housing 51 and is secured to the rack 54. Thus, movements of rack 54 as effected by operation of the control handle 52 correspondingly actuates the end of the cable core wire 57 relative to casing 56 at the control unit 50.

The actuating end of cable 49 opposite from the control unit 50 is provided with a telescoping mechanism including the tubular members 58 and 59. The tubular member 58 constitutes a rigid end portion of the core wire 57 and is slidable on tubular member 59 which constitutes a rigid extension of cable casing 56. The tubular casing extension member 59 carries a barrel connector element 60 which is adapted for pivotal support by the securement pin 61 extending therethrough.

Referring now to FIG. 6 for a right hand propeller 4, the control unit 50 is shown in position equivalent to mounting of the unit on the right side of the watercraft as one faces forwardly. In this position of control unit 50, the free end of tubular member 58 is pivotally secured to the projection 45 of the transom bracket 34 at anchor location 62 and the securement pin 61 extending through the barrel connector element 60 is secured in the upper mounting hole 36 of walking beam 33. In the neutral positions of beam 33 and control unit 50 respectively, the cable 49 is provided with a given amount of slack as shown in FIG. 6. When the control handle 52 is moved to the left as viewed in FIG. 6 from the upright neutral position to the forward drive position, the rack 54 is correspondingly moved to the left pulling the core wire 57 to a more taut condition and thereby causing cable casing 56 to assume position 56a to decrease the effective length of the telescoping mechanism and pivot the beam 33 to the forward drive position. Movement of handle 52 to the right from the upright neutral position as viewed in FIG. 6 effects corresponding movement of rack 54 to the right giving rise to increased slack in the core wire 57 causing cable casing 56 to assume position 56b and increase the effective length of the telescoping mechanism to thereby pivot beam 33 to the reverse drive position.

In FIG. 7 the control unit 50 is shown in position for a right hand propeller and equivalent to mounting the unit on the left side of the watercraft as one faces forwardly. In this position of the control unit 50, the free end of tubular core wire extension member 58 is pivotally secured to the upper mounting hole 36 in beam 33 and the pin 61 through the barrel connector element 60 on tubular member 59 is pivotally secured to the anchor location 62 in the projection 45 of transom bracket 34. With the telescoping mechanism on cable 49 mounted in the manner described, the walking beam 33 is directly actuated by the cable core wire 57. Thus, rotation of handle 52 from the upright neutral position to the right as viewed in FIG. 7, moves rack 54 to the right pulling the core wire 57 to decrease the effective length of the telescoping mechanism and thereby move the beam 33 into the forward drive position. Conversely, rotation of handle 52 from neutral to the left as viewed in FIG. 7, moves rack 54 to the left pushing the core wire 57 to increase the effective length of the telescoping mechanism and thereby causing the beam 33 to move into the reverse drive position.

As explained hereinbefore, for a left hand propeller 31 the walking beam 33 must be pivoted oppositely from a right hand propeller 4 to attain the respective drive positions. Referring to FIG. 8 for a left hand propeller 31, the control unit 50 is shown in position equivalent to mounting the unit on the right side of the watercraft as one faces forwardly. For right side mounting, the free end of tubular member 58 is pivotally secured to the projection 63 of transom bracket 34 at anchor location 64 and pin 61, extending through the barrel connector element 60 on the tubular casing extension member 59, is secured in the lower mounting hole 37 of the walking beam 33. As in the case for right side mounting and right hand propeller, cable 49 for left side mounting and left hand propeller is provided with a given amount of slack when the control unit 50 and beam 33 respectively are in neutral position as shown in FIG. 8. In accordance with the showing in FIG. 8, when the control handle 52 is moved to the left or forward drive position from the upright neutral position, rack 54 is correspondingly moved to the left pulling the core wire 57 to a more taut condition and thereby causing cable casing 56 to assume position 56c to decrease the effective length of the telescoping mechanism and thereby pivot beam 33 to the forward drive position. With movement of handle 52 to the right or reverse drive position from neutral, the rack 54 moves correspondingly to the right pushing the core wire 57 to a position of increased slack causing casing 56 to assume position 56d to increase the effective length of the telescoping mechanism and thereby pivot beam 33 to the reverse drive position.

In accordance with FIG. 9 and for a left hand propeller 31, the mounting for the telescoping mechanism for cable 49 is generally reversed from the mounting in FIG. 8 to provide for mounting of the control unit 50 on the left side of the watercraft as one faces forwardly. In this position of the control unit 50, the free end of the tubular core wire extension member 58 is pivotally secured to the lower mounting hole 37 provided in beam 33 and the pin 61 through the barrel connector element 60 on tubular member 59 is pivotally secured to the anchor location 64 on projection 63 of transom bracket 34. The cable connection of FIG. 9 provides for direct actuation of beam 33 by the core wire 57. In accordance with FIG. 9, movement of control handle 52 to the right or forward drive position from the upright neutral position, moves rack 54 correspondingly to the right pulling the core wire 57 in a direction to decrease the effective length of the telescoping mechanism and thereby moves the beam 33 into the forward drive position. And rotation of control handle 52 to the left or reverse drive position from neutral, moves rack 54 correspondingly to the left pushing the core wire 57 in a direction to increase the effective length of the telescoping mechanism and move the beam 33 into its reverse drive position.

Where as here, two push-pull cables 28 and 49 are serially and simultaneously actuated to actuate the clutch element 14, it is generally difficult to adjust or synchronize actuation of the cables to provide for a timely and complete clutch engagement in accordance with operation of control handle 52 of the control unit 50. This invention further provides for substantially accurate adjustment of synchronization of the cables 28 and 49 to provide substantially timely and complete clutch engagement in accordance with operation of the control handle 52.

In the process of adjustment for a right hand propeller 4, the core wire 27 of push-pull cable 28 is pushed into the cable casing 29 as far as full engagement between teeth 20 on clutch element 14 and teeth 19 on forward gear 11 permit to establish the forward gear position for cable 28 and the corresponding telescoping mechanism. In the forward gear position of cable 28 the telescoping mechanism is mounted by securing the free end of tubular member 43 at its anchor location 46 and the pin 48 for the barrel connector element 47 on tubular member 44 within the arcuate slot 38 of the walking beam 33 as shown in FIG. 10. The walking beam 33 is now in the forward gear position, and in this position the arcuate slot 38 is substantially concentric with respect to the anchor location 46. In view of the concentric relationship of slot 38 to anchor location 46 in the forward gear position, pin 48 may be secured anywhere within the slot without effecting a change in the forward drive position of beam 33. As shown in FIG. 10, however, pin 48 is secured in the lower portion of slot 38.

With the walking beam 33 remaining in the forward drive position, the control handle 52 of the control unit 50 is placed in the forward drive position to likewise place cable 49 and the corresponding telescoping mechanism in the forward drive position. For a control unit to be mounted on the left side of the watercraft as shown in FIG. 10 and with cable 49 in the forward drive position, the free end of tubular member 58 is secured to the beam 33 at upper mounting hole 36 and the barrel connector element 60 is threadedly moved along the threaded surface 65 on tubular member 59 to place the pin 61 in alignment with the hole at anchor location 62. With the securement of pin 61 at anchor location 62 the cables 28 and 49 are synchronized to provide substantially timely and complete forward drive clutch engagement in accordance with movement of the control handle 52 to the forward drive position.

For a control unit to be mounted on the right side of the watercraft, the foregoing process is the same except that the relative securement positions of the free end of tubular member 58 and pin 61 for cable 49 are reversed.

After cables 28 and 49 are properly synchronized for forward drive operation, control handle 52 on control unit 50 is moved to the reverse drive position which will pivot the walking beam 33 to the left or reverse drive position as viewed in FIG. 10, placing the casing 29 of cable 28 in the position 29e. Without further adjustment it is unlikely that the shifted cable casing position 29e will effect a complete reverse drive clutch engagement. And in view of the fact that pin 48 for barrel connector element 47 on tubular member 44 was placed in the lower portion of slot 38, it is likely that the clutch element 15 stopped some distance short of complete engagement with reverse gear 12. To attain the desired reverse drive synchronization, the pin 48 is loosened from its securement in slot 38 and is moved upwardly in the slot as shown in FIG. 10, until the cable casing 29 reaches the larger loop 29b wherein complete clutch engagement is effected. The movement of pin 48 within slot 38 to attain reverse drive synchronization of cables 28 and 49 will not disturb the forward drive synchronization in view of the concentric relationship of the slot to the anchor location 46 which permits the pin to be secured anywhere in the slot for forward drive synchronization.

For a left hand propeller 31 the process for synchronizing cables 28 and 49 is the same as herein described for a right hand propeller 4 except that the initial adjustment is for reverse drive with the slot 38 disposed circumferentially with respect to anchor location 46 so that the subsequent adjustment for forward drive will not disturb the initial reverse drive adjustment.

The invention thus provides a gear shift control means adapted to accommodate propellers of both right and left hand rotation and the mounting of a remote control unit on either side of the watercraft. The invention further provides for adjustment means for the gear shift control means to assure timely and complete clutch engagement in accordance with operation of a remote control unit.

Various modes of carrying out the invention are contemplated as being within the scope of the following claims particularly pointing out and distinctly claiming the subject matter which is regarded as the invention.

I claim:

1. In combination with an outboard propulsion unit, said propulsion unit being adapted for mounting on the transom of a watercraft and having a propeller and drive means therefor including forward and reverse gears selectively engageable by movable clutch means to provide forward and reverse drive respectively for said unit, control means for actuating the clutch means comprising a lever mounted inboard of the watercraft and being pivotal between a forward drive position and a reverse drive position, flexible push-pull means extending through the transom of the watercraft and connecting the lever and clutch means to provide for actuation of the clutch means in accordance with lever movement, a shift control unit mounted in the watercraft at a location remote from said lever, and flexible push-pull means connecting the shift control unit and the lever for actuating the lever in accordance with operation of the remote shift control unit.

2. The invention as set forth in claim 1 wherein the last named flexible push-pull means is selectively connectable to the lever to accommodate selective mounting of the shift control unit on either side of the watercraft.

3. The invention as set forth in claim 1 wherein the lever is pivotally mounted substantially at its center and is adapted for selective connection to the push-pull means from the shift control unit at locations spaced equidistantly and on opposite sides from its center to selectively accommodate propellers of opposite hand rotation.

4. The invention as set forth in claim 1 wherein means associated with the lever are provided for synchronizing the operation of the several push-pull means to provide for complete clutch engagement with the forward and reverse gears in accordance with operation of the remote shift control unit.

5. In combination with an outboard propulsion unit, said propulsion unit being adapted for mounting on the transom of a watercraft and having a propeller and drive means therefor including forward and reverse gears selectively engageable by movable clutch means to provide forward and reverse drive respectively for said unit, control means for actuating the clutch means comprising a lever pivotally mounted inboard of the watercraft and being moveable between a forward drive position and a reverse drive position, flexible push-pull means extending through the transom of the watercraft and connecting the lever and clutch means to provide for actuation of the clutch means in accordance with lever movement, a fixed anchor location provided in spaced relation to one side of said lever, a pair of telescopingly related elements, a shift control unit, flexible push-pull means having one end thereof operatively connected to the shift control unit and comprising a core wire and a casing therefor, means connecting the other end of the core wire to one of said elements, means connecting the other end of the casing to the other of said elements, whereby operation of the shift control unit effects telescoping move of said elements, means pivotally connecting one of said elements to the lever, and means pivotally connecting the other of said elements to the anchor location, said telescopingly related elements providing for the lever actuation to actuate the clutch means.

6. The invention as set forth in claim 5 wherein the connections from the telescopingly related elements to the lever and anchor location respectively are adapted to be reversed to provide for mounting of the shift control unit selectively on either side of the watercraft.

7. The invention as set forth in claim 5 wherein the lever is pivotally mounted substantially midway between the ends thereof and a fixed anchor location corresponding to each end of the lever is provided in spaced relation to one side thereof, said telescopingly related elements being selectively connectable between either end of the lever and the corresponding anchor location to selectively accommodate propellers of opposite hand rotation.

8. In combination with an outboard propulsion unit, said propulsion unit being pivotally mounted on the transom of a watercraft with respect to a generally transverse horizontal axis and a generally vertical axis to respectively provide for tilt and steering movements of the unit and said unit having a propeller drive means including forward and reverse gears selectively engageable by movable clutch means to provide forward and reverse drive respectively for said unit, control means for actuating the clutch means comprising a lever pivotally mounted substantially at its center and inboard of the watercraft and being movable between a forward drive position and a reverse drive position, flexible push-pull means extending through an opening in the transom of the watercraft and connecting the lever and the clutch means to provide for actuation of the clutch means in accordance with lever movement, and means to actuate the lever, said flexible push-pull means being disposed in spaced relation from at least one of the mounting axes of the propulsion unit and being axially movable in said transom opening to accommodate movement of the unit on said spaced axis.

9. The invention of claim 8 wherein said flexible push-pull means is disposed in spaced relation from the tilt and steering axes of the propulsion unit and is movable axially in said transom opening to accommodate tilt and steering movements of the unit.

10. In combination with an outboard propulsion unit, said propulsion unit being adapted for mounting on the transom of a watercraft and having a propeller and drive means therefor including forward and reverse gears selectively engageable by moveable clutch means to provide forward and reverse drive respectively for said unit, control means for actuating the clutch means comprising a lever pivotally mounted inboard of the watercraft and being moveable between a forward drive position and reverse drive position and said lever having a generally radially extending slot, a fixed anchor location provided in spaced relation to one side of said lever and opposite said slot, a pair of telescopingly related elements, flexible push-pull means having one end thereof operatively connected to the clutch means and comprising a core wire and a casing therefor, means connecting the other end of the core wire to one of said elements, means connecting the other end of the casing to the other of said elements, means pivotally connecting one of said elements to the lever and fixedly within said slot, means pivotally connecting the other of said elements to the anchor location, whereby telescoping movement of said elements provided by the lever effects corresponding actuation of the clutch means, a shift control unit mounted in the watercraft at a location remote from said lever, and flexible push-pull means operatively connecting the shift control unit and the lever for actuating the lever in accordance with operation of the shift control unit, said means for pivotally connecting one of said elements to the lever and fixedly within said slot being releaseable and moveable within the slot to synchronize the operation of the several push-pull means and thereby provide for complete clutch engagement with the forward and reverse gears in accordance with operation of the remote shift control unit.

11. The invention as set forth in claim 10 wherein the slot in said lever constitutes a portion of a circle and is disposed circumferentially with respect to the anchor location in a given drive position of the lever so that the means pivotally connecting one of said elements to the lever and fixedly within said slot is securable anywhere in the slot without disturbing the synchronization between the several push-pull means in said given drive position of the lever.

12. In apparatus providing for movement of remote moveable means between two given positions, support means, a lever pivotally mounted on said support means and being moveable between a first position and a second position corresponding to the given positions of the moveable means and said lever having a generally radially extending slot, a fixed anchor location provided on said support means in spaced relation to one side of said lever and opposite said slot, a pair of telescopingly related elements, flexible push-pull means having one end thereof operatively connected to the movable means and comprising a core wire and a casing therefor, means connecting the other end of the core wire to one of said elements, means connecting the other end of the casing to the other of said elements, means pivotally connecting one of said elements to the lever and fixedly within said slot, means pivotally connecting the other of said elements to the anchor location, whereby telescoping movement of said elements provided by the lever effects corresponding actuation of the movable means, a control unit, and flexible push-pull means operatively connecting the control unit and the lever for actuating the lever in accordance with operation of the control unit, said means for pivotally connecting one of said elements to the lever and fixedly within said slot being releaseable and moveable within the slot to synchronize the operation of the several push-pull means and thereby provide for complete movement of the moveable means into said two given positions in accordance with operation of the control unit.

13. The invention as set forth in claim 12 wherein the slot in said lever constitutes a portion of a circle and is disposed circumferentially with respect to the anchor location in one of the positions of the lever so that the means pivotally connecting one of said elements to the lever and fixedly within said slot is releasable and moveable anywhere in the slot without disturbing the synchronization between the several push-pull means in the said position of the lever.

References Cited in the file of this patent

UNITED STATES PATENTS

| | | |
|---|---|---|
| 2,977,816 | Rice | Apr. 4, 1961 |
| 3,006,311 | Hansson | Oct. 31, 1961 |